March 8, 1955 M. R. SIMMONDS 2,703,607
MULTIPLE CELL FUEL TANK ARRANGEMENT
Filed March 25, 1949
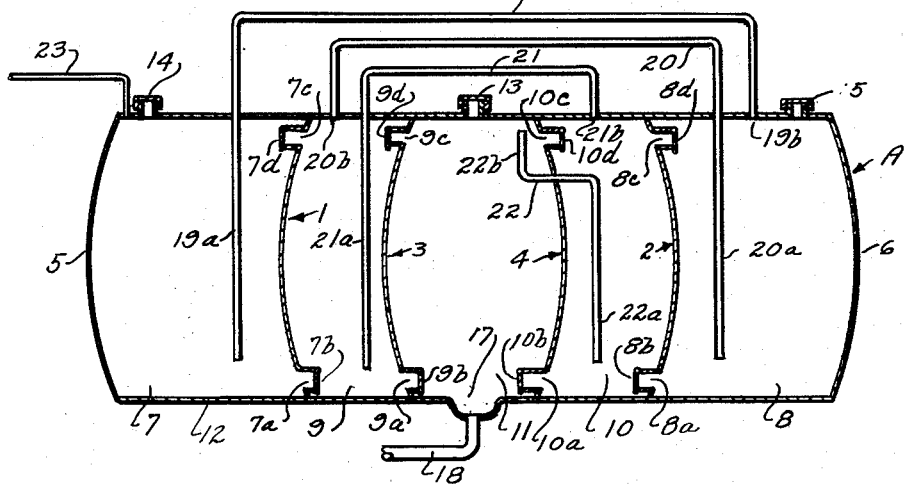
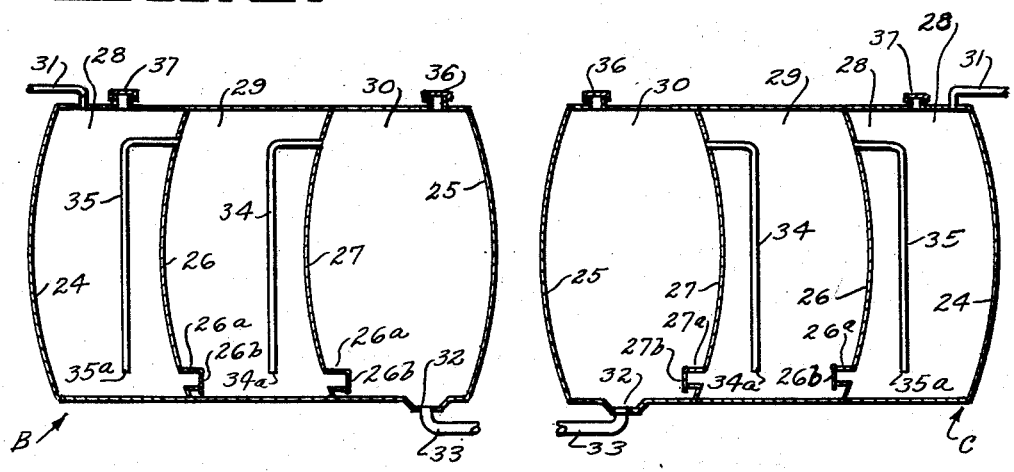
INVENTOR.
MILO R. SIMMONDS
BY
ATTORNEYS

United States Patent Office 2,703,607
Patented Mar. 8, 1955

2,703,607

MULTIPLE CELL FUEL TANK ARRANGEMENT

Milo R. Simmonds, Niagara Falls, N. Y., assignor to the United States of America as represented by the Secretary of the Air Force Application March 25, 1949, Serial No. 83,474

8 Claims. (Cl. 158—46)

This invention relates to fuel systems, and primarily fuel storage systems for aircraft, having for an object the provision of means for maintaining the center of gravity of the weight of the fuel within predetermined controlled limits both during the filling of a plurality of fuel supply tanks in the aircraft and during the emptying of the tanks while in flight.

A further object is the provision of an improved fuel supply and delivery system comprising a plurality of associated fuel supply tanks for an aircraft located at opposite sides of the center of gravity of the aircraft, including means for alternately charging, or discharging, tanks at opposite sides of the center of gravity of the aircraft to prevent the weight of fuel in the tank from being displaced beyond predetermined limits relating to the center of gravity.

A further object is the provision of a fuel tank system for aircraft having a plurality of fuel cells and means for filling said fuel cells automatically in a predetermined sequence, and emptying the cells in a predetermined sequence, alternately at opposite sides of the center of gravity of the cells to prevent material shifting of the fuel weight relative to the center of gravity as the fuel is used up.

A still further object of the invention is the provision of a liquid supply tank means of large capacity having a plurality of baffles dividing the tank means at opposite sides of the center of gravity thereof into a plurality of smaller connected fuel supply cells having automatic fuel delivery means for alternately filling the fuel supply cells at opposite sides of the center of gravity of the tank means and causing the cells to be emptied alternately at opposite sides of the center of gravity of the tank means as the fuel is used up.

Other objects and advantages will become apparent from the following description taken in connection with the accompanying drawings in which like reference characters refer to like parts in the several figures.

Fig. 1 is a vertical sectional view through a preferred form of fuel tank incorporating my invention; and Fig. 2 is a vertical longitudinal sectional view through a plurality of fuel tanks, such as fuel and oxidizer tanks, incorporating a modified form of the invention.

Referring to Fig. 1 the reference numeral A indicates a large cylindrical or suitably shaped aircraft fuel supply tank or chamber having a plurality of bulkheads or partitions extending transversely across the tank at opposite sides of the center of gravity of the tank, from the ends of the tank inwardly and indicated at 1, 2, 3, 4, the end walls of the tank being indicated at 5 and 6, the intermediate walls or bulkheads 1, 2, 3, 4 dividing the tank into five fuel cells or compartments 7, 8, 9, 10 and 11.

The lower portions of each of the bulkheads 1, 2, 3 and 4 are each provided with a short tubular passage indicated at $7^a$, $8^a$, $9^a$ and $10^a$, each passage being closed by a check or flap valve $7^b$, $8^b$, $9^b$ and $10^b$ permitting fuel to discharge from the outer cells or compartments 7, 8 or 9 and 10 only in a direction toward the center cell 11. At the top of each of the bulkheads 1, 2, 3 and 4 is a second short small tubular passage $7^c$, $8^c$, $9^c$, and $10^c$ each closed by a flap or check valve $7^d$, $8^d$, $9^d$ and $10^d$ opening outwardly or only toward the outer cells, or in the opposite direction from the check valves $7^b$, $8^b$, $9^b$, and $10^b$, located at the bottoms of the partitions 1, 2, 3 and 4. In the form of the invention shown in Fig. 1 of the drawings the fuel tank means is preferably cylindrical in cross section having the bulkheads 1, 2, 3 and 4 secured thereto around their peripheries, and the end closure 5 and 6 secured over the ends of the main elongated cylindrical portion 12.

A central filler opening and cap is provided in the top of the central cell 11 as indicated at 13, and if desired, for more rapid filling, supplemental filler openings, and caps may be provided as indicated at 14 and 15 in the tops of the outermost cells 7 and 8. Fuel is withdrawn from the bottom of the central cell or compartment 11 from the base of a sump or well 17, through a fuel outlet pipe 18. Fuel cells 7 and 8 are connected by a venting conduit 19 having a vertical portion $19^a$ and reaching nearly to the bottom of cell 7, the other end $19^b$ of the conduit 19 being in communication with the top of cell 8 at the opposite end of the cylindrical chamber 12.

A second venting conduit 20 is provided having a long vertical branch $20^a$ extending into communication with the bottom portion of the cell 8, the other end communicating with the top of the fuel cell 9 at $20^b$. The cells 9 and 10 are likewise connected together by a third venting tube 21 having the lower end of a vertical portion $21^a$ in communication with lower part of the cell 9 and the other end $21^b$ in communication with the top of the fuel cell 10. A fourth venting conduit 22 is secured in the wall or bulkhead 4 for the center tank 11, with a vertical end $22^a$ in communication with the lower portion of the fuel cell 10 and an upper or short end $22^b$ in communication with the top portion of the central cell 11.

Assuming all of the cells to be empty, fuel is preferably introduced through the filler cap openings 13, and since it can not escape through the check valve $9^b$ or $10^b$, until the cell 11 fills completely and the fuel level reaches the check valves $9^d$ and $10^d$. The check valves $9^d$ and $10^d$ then open and fuel is discharged through the central cell 11 and past the checks $9^d$ and $10^d$ into the adjacent or intermediate fuel cells 9 and 10.

Air which is trapped in the cells 9 and 10 above the liquid escapes through the check valves $7^d$ and $8^d$ or through vent 21, from fuel cell 10 to cell 9, the air or gas bubbling through the fuel and escapping through pipe 20 to cell 8 together with air or gas trapped in the cell 9 above the fuel.

When cells 9 and 10 are filled the check valves $7^d$ and $8^d$ then permit the excess fuel to flow past these checks into the two end cells 7 and 8. Trapped air in cell 8 passes out through vent pipe 19, bubbles through liquid in cell 7 and escapes through the venting tube 23 together with the air or gas above fuel level in cell 7.

If cells are filled through supplemental filler openings 14 and 15, or 15 and 14, the fuel in the outside cells 7 and 8 discharges into the other cells through the check valves $7^b$, $8^b$, and $9^b$, $10^b$, and trapped air or gas escapes through vents tubes 19, 20 and 21 and passes the checks $8^d$, $7^d$, $9^d$ and $10^d$ and escapes out through venting conduit 23.

The only venting means for the escape of air or gas from tanks is the venting passage 23 but in order to discharge the fuel cells alternately through the sump 17 in the central cell 11, and through the fuel discharge conduit 18, air or gas is admitted under some pressure through the air (venting) passage 23 either by a pump, or under a static pressure head from the aircraft, such as effected by a ram jet collector (not shown) connected to the conduit 23, and placed in the airstream of the aircraft incorporating my improved fuel supply system. Air admitted under pressure through the vent tube 23, pressurizes the cell 7 to force the fuel in the cell 7 out through check $7^b$. Fuel from the cell 7 passes substantially direct to the sump 17, through the two checks $7^b$ and $9^b$ as the other cells remain filled. When, however, the level in cell 7 drops sufficiently to uncover the lower end of vent pipe $19^a$, then air or gas pressure from the chamber 7 escapes through the vent conduit 19 to the top of the liquid in cell 8, pressurizing this cell to cause a direct flow from the cell 8 through the checks $8^b$ and $10^b$ into the sump 17. Cells 9, 10 and 11 in the meantime remained full, as the two outside cells 7 then 8 are emptying.

When fuel level in cell 8 drops below the lower end $20^a$ of vent pipe 20 pressure is then admitted through pipe 20 to the top of cell 9, and cell 9 is then caused to discharge into sump 17 through the check valve $7^b$. When the fuel level in cell 9 uncovers the lower end of vent pipe 21ᵃ the pressure from the emptying compartment 9 becomes effective on the liquid in cell 10 to cause this cell to empty directly through the check 10ᵇ, into sump 17, again alternately emptying the two fuel cells at opposite sides of the center cell 11. Finally, when the level in the last of the outside end tanks uncovers the end 22ᵃ of the vent pipe 22, pressure from the preceding cell (10) is admitted to the top of central cell 11 accelerating the emptying thereof.

From the above it will be seen that the bulkheads 1, 2, 3 and 4, and check valves 7ᵇ, 8ᵇ, 9ᵇ and 10ᵇ effectively control the flow from the tanks outwardly away from the central cell 11 as the cells or compartments empty alternately at opposite sides of the center of gravity of the tank A as a whole, the partitions or bulkheads 1, 2, 3 and 4 also confining the liquid to prevent surging back and forth between the ends of the tank.

Referring now to the modified showing in Fig. 2, there are two multi-cell or compartment tanks illustrated in aligned positions, spaced longitudinally relative to each other indicated at B and C respectively. The tanks B and C may be used for supplying a combustion fuel and a liquid oxidizer to a thermal jet engine or engines for jet propulsion aircraft, the tanks B and C being preferably identical, each having end closure walls 24 and 25 and bulkheads or partitions 26 and 27 dividing the respective tanks into three or more cells each, indicated at 28, 29 and 30. The adjacent fuel cells of the two tanks being indicated at 30 while the intermediate and outboard fuel cells are respectively designated 29 and 28. Vent passages 31 communicate with the outer upper ends of the cells 28 to provide venting means during filling of the cells and for pressurizing the fuel or liquid within the cells to effect discharge of the fuel and oxidizer from the respective tanks. Each of the tanks B and C is provided with a sump or well 32 to which discharge conduits 33 are connected, leading therefrom to the combustion chambers, not shown, of the aircraft "jet" engines, also not shown, the sumps 32 being preferably located in the inboard compartments in the bottoms thereof. The bulkheads 26 and 27 each have short tubular conduits 26ᵃ and 27ᵃ, closed by check or flap valves 26ᵇ and 27ᵇ, located above the bottoms of the tanks and opening toward the inner cells 30. In this arrangement the cells 30 and 29 each have a vent conduit 34 and 35 leading respectively from openings in the top portions of the partitions 26 and 27, extending downwardly to points 34ᵃ and 35ᵃ adjacent the bottoms of the tanks.

A filler opening and cap 36 is provided for filling the tanks 25, and if desired a second filler opening and cap 37 may be provided. After the cells 28, 29 and 30 of the tanks B and C are completely filled the fuel and the oxidizer, when withdrawn through the discharge conduits 33 is accelerated by pressure medium applied through the vent conduit 31, causing the liquid in the outboard tanks 28 to first empty, the liquid being forced directly through the check valves 26ᵇ and 27ᵇ to the sumps 32 and then discharged through the discharge conduits 33. When the liquid level in cells 28 drops sufficiently to uncover the lower ends 35ᵃ of the vent tubes 35 the pressure medium from the main vent conduits 31 passes through the vent tubes 35 to the top of the cells 29 causing them to empty, discharging directly through the check valves 27ᵇ into and through the cells 30 to the sumps 32. When the liquid levels in the fuel cells 29 drop sufficiently to uncover the inlet ends 34 of the vent conduits 34 the pressure medium from the vent pipes 31 enters the vent tubes 34 and forces the last, or inboard, fuel cells 30 to empty.

It will therefore be noted that the cells 29 and 30 in the tanks B and C, as well as the cells in the tank A in Figure 1 are caused to empty in a predetermined progressive sequence and in the two tanks B and C as illustrated in Fig. 2 the cells empty progressively in a sequence from the opposite ends of the respective tanks so that the weight of the liquid on the opposite sides of the center of gravity of the tanks as a unit does not shift materially fore and aft as the fuel is used up.

Although the drawings illustrate a simplified tank arrangement for exemplary purposes, disclosing tanks having a relative small number of cells or compartments, various changes and modifications may be made in the structure as set forth, including changes in the size and number of compartments and variations in the arrangement of the check valves and venting means, without departing from the spirit of the invention as defined in the appended claims.

I claim:

1. In a liquid fuel delivery system, a liquid fuel tank, a plurality of fuel cells within said tank, one of said cells having a fuel discharge outlet therein for discharging fuel from the tank, check valve communicating means between said cells at the lower portions thereof establishing one way communication between said cells toward the cell having the fuel discharge outlet therein, venting conduit means between said last mentioned cell and an adjacent cell having one end thereof in communication with the top of the cell having the discharge outlet therein and its other end in communication with said adjacent cell in the lower portion thereof, and venting conduit means in communication with said adjacent cell at the top portion thereof for venting said adjacent cell to admit pressure therein to discharge the fuel therein.

2. In a liquid fuel delivery system, a liquid fuel reservoir comprising a plurality of fuel cells arranged in side by side relation, including a first cell having a fuel discharge outlet therein for discharging fuel therefrom and from the reservoir, a second cell adjacent said first cell having a check valve controlled communicating port means at the lower part thereof establishing free one-way communication from said second cell to said first cell, venting conduit means passage between the second cell and the first cell having an inlet disposed adjacent the bottom of the second cell and an outlet end in communication with the top portion of the first cell.

3. In a liquid fuel delivery system, a fuel tank partitioned transversely to provide a plurality of fuel reservoirs arranged in side by side relation, including a first fuel cell having a discharge outlet therein for discharging fuel therefrom and from said tank, a second fuel cell adjacent said first fuel cell, check valve communicating means between the second and the first fuel cell establishing one-way communication from said second cell to said first cell, venting conduit means between said second and first cells having an inlet disposed in the second cell adjacent the bottom thereof and an outlet in communication with the upper portion of said first cell, a third fuel cell in said tank next to the second cell having a check valve control passage therefrom opening towards said first cell, second venting conduit means between said second and third fuel cells having an inlet in the third cell adjacent the bottom thereof and an outlet in communication with the top portion of the second cell, and venting means in the third cell at the top portion thereof.

4. In a liquid fuel system a tank partitioned to provide a plurality of liquid reservoirs arranged in side-by-side relation, including a first cell having a discharge outlet therein for discharging liquid therefrom and from said tank, a second cell adjacent the said first cell, check valve communication means between said second and said first cells establishing one-way communication from the second cell to the first cell, a venting conduit between said second and first cells having an inlet disposed in the second cell adjacent the bottom thereof and an outlet in the upper portion of said first cell, a third cell in said tank having a check valve controlled passage therein opening toward the first cell, and a second venting conduit between said second and third cells having its inlet in the third cell adjacent the bottom thereof and its outlet in the top portion of the second cell, a fourth cell in said tank adjacent said second cell having check valve conduit means establishing one-way communication between said fourth cell and the second cell in a direction towards the first cell, a venting conduit between the third and fourth cells having an inlet in the third cell adjacent the bottom thereof and an outlet in the upper portion of said fourth cell, and venting conduit means in communication with said fourth cell at the top portion thereof for applying a venting pressure to the fourth cell.

5. In a liquid fuel delivery system a fuel tank partitioned to provide a plurality of reservoirs arranged in side-by-side relation, including a first cell having a discharge outlet therein for discharging liquid therefrom and from said tank, a second cell adjacent the said first fuel cell, check valve communication means between the second and first cells establishing one-way communication from the second cell to the first cell, a venting conduit between said second and first cells having an inlet disposed in the second cell adjacent the bottom thereof and an outlet in the upper portion of said first cell, a third cell having a check valve controlled passage therein opening toward the first cell, and a second venting conduit between said second and third cells having an inlet in the third cell adjacent the bottom thereof and an outlet in communication with the top portion of the second cell, a fourth cell adjacent said second cell having check valve conduit means establishing one-way communication between said fourth cell and the second cell in a direction toward the first cell, a venting conduit between said third and fourth cells having an inlet in the third cell adjacent the bottom thereof and an outlet in the upper portion of said fourth cell, a fifth cell adjacent said third cell, check valve communicating means between the fifth cell and the third cell in the lower portions thereof opening toward the third cell, venting conduit means between the fifth and fourth cells with its inlet end in the fifth cell adjacent the bottom thereof and its outlet in the upper portion of the fourth cell, and venting conduit means in communication with the upper portion of the fifth cell for connecting the fifth cell to a venting pressure.

6. In a liquid fuel delivery system, an elongated tank, partitions therein dividing the tank into at least three cells, a liquid discharge conduit in the bottom of a first one of said cells to discharge the liquid contents thereof from said tank, check valve controlled conduit means in the partition between the first cell and an adjacent second cell establishing one-way communication from the lower portion of the second cell into said first cell, venting conduit between the bottom portion of the second cell and the upper portion of the third cell in said tank adjacent the second cell and remote from said first cell, a venting conduit in communication with the lower portion of the third cell and the upper portion of the second cell, check valve communicating conduit means between lower portions of the second and third cells establishing one-way communication from said third cell to said second cell at the lower portion thereof, and venting conduit means in communication with the upper portion of the third cell for applying a venting pressure to the third cell.

7. Apparatus as claimed in claim 6, including a liquid filler opening and cap therefor located in the upper portion of the third cell for introducing a liquid thereinto.

8. Apparatus as claimed in claim 6 including check valve controlled conduit means between the upper portion of the first cell, second, and third cells establishing one-way communication from the upper portion of the first cell to the upper portions respectively of the second and third cells, and filler opening and cap closure means for introducing liquid into said second and third cells simultaneously.

References Cited in the file of this patent

FOREIGN PATENTS 629,362     France _____ July 23, 1927